United States Patent Office 3,817,942
Patented June 18, 1974

3,817,942
MANUFACTURE OF POLY(AMIDE-IMIDES)
Jenoe Kovacs, Bobenhem-Roxheim, and Ernst Schefczik, Ludwigshafen, Germany, assignors to Badische Anilin- & Soda-Fabrik Aktiengesellschaft, Ludwigshafen, Germany
No Drawing. Filed Jan. 18, 1973, Ser. No. 324,857
Int. Cl. C08g 20/32
U.S. Cl. 260—78 TF         6 Claims

ABSTRACT OF THE DISCLOSURE

A process for the manufacture of poly(amide-imides) in which reaction products of trimellitic anhydride and unilaterally N-monoacetylated diamines are polycondensed to the corresponding poly(amide-imides) at temperatures of from 120° to 500° C. with the elimination of acetic acid. The poly(amide-imides) thus formed are suitable for use as wire enamels and electrical insulating materials.

---

The present invention relates to a process for the manufacture of poly(amide-imides) from the reaction products of trimellitic anhydride and unilaterally N-monoacylated aliphatic, cycloaliphatic or aromatic diamines by polycondensation with the elimination of acetic acid.

It is known to make poly(amide-imides) from trimellitic anhydride chloride and aliphatic or aromatic diamines in polar solvents (German Published Application No. 1,520,968). The hydrochloric acid produced in this process is removed by precipitation of the polymer in a precipitant such as water (German Published Application No. 1,495,216). Alternatively, the said hydrochloric acid may be neutralized by adding alkylene oxides (cf. U.S. Pat. 3,347,828 and French Pat. 1,386,617). The volatile compounds thus formed may be removed from the reaction medium during further processing. One drawback of these processes is that the recovery of the polymer involves precipitation, i.e. additional operations and extra cost. If it is desired to further process the polymers into films, wire enamels, coatings, fibers or laminates, the polymer must be redissolved.

When alkylene oxides are used, there must be present in a large excess in order to bind all the HCl formed, which means that processing is not without danger.

Another known process is the manufacture of poly-(amide-imides) from trimellitic anhydride and di-isocyanates (German Published Application No. 1,924,859). This reaction is however difficult to control. The isocyanates cause side-reactions. The elimination of $Cl_2$ from the polymer chain very often leads to crosslinking or to a reduction in molecular weight. In order to remove by-products from the solutions, it is in this case, too, necessary to precipitate the polymers.

It is an object of the present invention to provide a process by which high molecular weight poly(amide-imides) having valuable properties may be prepared in a simple manner.

We have found that, surprisingly, poly(amide-imides) of controllable high molecular weight may be simply prepared by polycondensing compounds of the formula (B) below with the elimination of acetic acid. The monomeric starting compound can be obtained in a simple manner by reacting trimellitic anhydride with a unilaterally mono-acylated diamine (A). The sequence of reactions may be represented by the following equation:

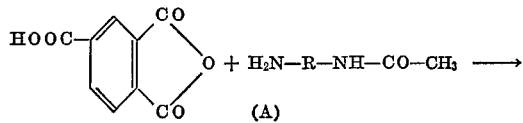

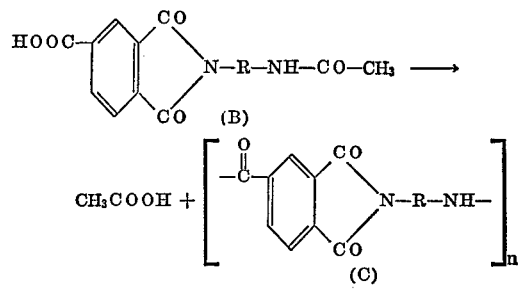

In the above formulae, R denotes a divalent aliphatic, cycloaliphatic, aromatic or aliphatic/aromatic radical of from 2 to 18 carbon atoms.

The polycondensation of compound (B) may, according to the nature of said N-acyl compound (B), be carried out in bulk, i.e. in the absence of solvents, or in high-boiling inert solvents or other heat transfer agents. If desired, equimolar amounts of acetic acid may be distilled off if extremely high molecular weight products are required. However, less than equimolar amounts of acetic acid may be distilled off if it is desired to manufacture for example oligomers or products of lower molecular weight. The advantage of this process is that there is always equimolarity of the functional groups, since these are contained in the same molecule. It is thus possible to prepare low-viscosity solutions of products having lower molecular weights permitting a high solids content and then, during further processing, e.g. during the baking of wire enamels or the casting of sheeting or film or in the manufacture of laminate prepregs, to produce poly(amide-imides) of high molecular weight. It is also possible, however, to crosslink poly(amide-imides) of low molecular weight with crosslinking agents such as esters of polyfunctional carboxylic acids, polyisocyanates, polyepoxides, trishydroxyethyl isocyanurate, etc.

Polycondensation is conveniently carried out at temperatures of from approximately 120° to 500° C., preferably from approximately 150° to 380° C. The process is advantageously carried out at subatmospheric pressure so that the elimination product can be removed rapidly from the reaction medium. The reaction is very simple to carry out: the starting compound of formula (B), the N-acetylaminoalkyl- (or aryl) trimellitic acid imide, is placed in, say, a multineck flask and heated therein to about 120° C., the temperature being advantageously so adjusted that it rises at a rate of about 10° C. per 20 minutes; the time for each 10° C. may be varied from 2 to 60 minutes depending on the rate of elimination of the acetic acid. It is advantageous to pass an inert gas such as nitrogen through the reaction flask to hasten the removal of the eliminated acetic acid and also to avoid any risk of oxidation. The eliminated acetic acid may be collected and weighed from time to time, this providing a good means of monitoring the reaction rate.

Alternatively however, the polycondensation reaction may be carried out in high-boling solvents which are inert under the reaction conditions, for example, 4,4'-diamino-N,N,N',N'-tetramethyldiphenylmethane, xylenol, acetanilide, glycol ether and other solvents. The poly(amide-imide) thus formed usually precipitates from the reaction medium and can be isolated for example by filtration or centrifuging, preferably after cooling the reaction medium.

The preparation of the N-substituted trimellitic imides of formula (B) may be effected by reacting trimellitic acid or preferably trimellitic anhydride with monoacylated aliphatic or aromatic diamines. In some cases it is also possible to so react trimellitic acid or trimellitic anhydride with a damine in the presence of an acylating agent that one amino group of the diamine reacts with the anhydride or dicarboxylic acid group of trimellitic acid and the other amino group reacts with the acylating agent.

Examples of particularly suitable unilaterally N-acylated diamines are the N-monoacetyl derivatives of aliphatic, cycloaliphatic, aliphatic/aromatic or aromatic diamines having from 2 to 18 carbon atoms, e.g. ethylene dimaine, tetramethylene diamine, hexamethylene diamine, octamethylene diamine, nonamethylene diamine, dodecamethylene diamine, m-phenylene diamine, p-phenylene diamine, 4,4′-diaminodicyclohexylmethane, 4,4′-diaminodiphenylmethane, 2-bis(p-aminophenyl)-propane, 4,4′-diaminodiphenylene sulfide, 4,4′-diaminodiphenyl ether, 4,4′-diaminobenzophenone, 4,4′-diaminophenylsulfone and 4,4′-diaminodiphenylcyclohexane.

The polycondensation of the compound of formula (B), i.e. the elimination of acetic acid, may be effected without the use of a catalyst. However, in many cases the co-use of small amounts of a catalyst, particularly an acid-acting catalyst such as boric acid, phosphoric acid, p-toluenesulfonic chloride or similar catalysts, is advantageous. This accelerates the reaction and permits the use of lower polycondensation temperatures.

The poly(amide-imides) produced by the process of the invention generally have a specific viscosity of from about 0.1 to about 5 dl./g., preferably from 0.2 to 2 dl./g. (measured in N-methylpyrrolidone at a concentration of 0.5 g./l.).

The high molecular weight poly(amide-imides) and the poly(amide-imide) condensates of lower molecular weight, as produced by the process of the present invention, may be used alone or in admixture with other thermally stable polymers or crosslinking agents for the production of coatings, impregnations, foams or moldings. Due to their excellent mechanical properties, their good heat-shock resistance and their high softening point, the poly(amide-imides) produced by the present process are particularly suitable for use as wire enamels and electrical insulating materials.

The invention is further illustrated by the following Examples in which parts and percentages are by weight unless otherwise stated. Parts by volume bear the same relation to parts by weight as the liter to the kilogram.

EXAMPLE 1

Preparation of a starting product

In a reactor having a capacity of 2,000 parts by volume and equipped with a stirrer, reflux condenser and thermometer, there are mixed 150 parts of anhydrous ethylene diamine with 750 parts by volume of glacial acetic acid. The mixture is heated to the boil and 192 parts of trimellitic anhydride is added in the course of 2 hours. The mixture is then refluxed for 6 hours. 500 parts by volume are then distilled off at atmospheric pressure and the residue is poured onto a mixture of 1,000 parts of ice and 250 parts by volume of concentrated hydrochloric acid. After some time the precipitated product is suction filtered, washed with water and dried at 100° C. There is obtained 250 parts of N-(acetylaminoethyl)-trimellitic imide (yield 92% of theory). After recrystallization from acetic acid, the compound melts at 246° C. and shows the following analytical data:

| | Acetyl, percent | Acid number |
|---|---|---|
| Calcd | 16.6 | 204 |
| Found | 14.9 | 211 |

EXAMPLE 2

Preparation of a starting product 1,500 parts by volume of glacial acetic acid are placed in a reactor as described in Example 1. There are then added 192 parts of trimellitic anhydride (or 210 parts of trimellitic acid), 150 parts of p-aminoacetanilide and 50 parts of anhydrous sodium acetate. The mixture is refluxed for 8 hours and then allowed to cool. The resulting slurry of crystals is suction filtered. The product is washed with glacial acetic acid and with warm water and dried at 100° C. There is obtained 312 parts of N-(4-acetylaminophenyl)-trimellitic imide (yield 96.3% of theory). The compound does not melt below 330° C. and shows the following analytical data:

Calc.: C, 63.0%; H, 3.7%; N, 8.6%; O, 24.7%; acetyl, 13.3%.

Found: C, 62.8%; H, 4.0%; N, 9.0%; O, 24.5%; acetyl, 13.0%.

EXAMPLE 3

Preparation of poly(amide-imide)

32.4 parts of N-(3-acetylaminophenyl)-trimellitic imide is placed in a reactor having a capacity of 250 parts by volume. The contents of the reactor are then heated to 150° C. under a vacuum while passing through a stream of nitrogen. When this temperature is reached, it is further increased at a rate of 10° C. per 20 minutes until it reaches 330° C. At this temperature the theoretical amount of eliminated acetic acid has distilled off. The product is then removed from the reactor, pulverized and dissolved in N-methylpyrrolidone. The viscosity of the solution is 0.44 dl./g. (measured in N-methylpyrrolidone at a concentration of 0.5 g./l.). The N-methylpyrrolidone solution is then diluted with aromatics and used for wire coating. The resulting wire enamels have excellent mechanical properties, a heat-shock resistance of up to 300° C. and a softening point of 400° C.

Sheeting having a thickness of 50μ cast from the solution in N-methylpyrrolidone exhibits a tensile strength of 950 kg./cm.²

EXAMPLE 4

Preparation of poly(amide-imide)

100.8 parts of diphenyl ether and 27.6 parts of N-(2-acetylaminoethyl)-trimellitic imide are placed in a flask equipped with a stirrer and reflux condenser. The contents of the flask are then heated under nitrogen to 250° C. at a rate of 10° C./10 minutes. The temperature is then kept at 250° C. for 2 hours, during which time 6 parts of acetic acid distill off. The reaction mixture is cooled and the precipitated polymer is removed by suction filtration, washed with methanol and dried. The finely ground powder is then used to coat metal surfaces and flat wires at baking temperatures of from 300° to 350° C.

EXAMPLE 5

Preparation of poly(amide-imide)

32.4 parts of N-(4-acetylaminophenyl)-trimellitic imide is placed in a flask. The contents of the flask are then heated under a stream of nitrogen in vacuo to 150° C. The temperature is then raised to 360° C. at a rate of 10° C./10 minutes. When this temperature has been reached, the theoretical amount of acetic acid has distilled off. The resulting powder is then removed from the flask.

The product is sintered at 350° C. and a pressure of 1,500 kg./cm.². The tensile strength of the resulting material is 1,050 kg./cm.²

We claim:

1. A process for the manufacture of poly(amide-imides), wherein compounds of the formula

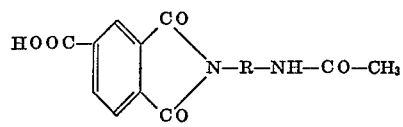

where R denotes a divalent aliphatic, cycloaliphatic, aromatic or aliphatic/aromatic radical containing from 2–18 carbon atoms, are polycondensed with the elimination of acetic acid at temperatures of from 120° to 500° C.

2. A process as claimed in claim 1, wherein the polycondensation is carried out in bulk.

3. A process as claimed in claim 1, wherein the polycondensation is carried out in the presence of a high-boiling inert solvent.

4. A process as claimed in claim 1, wherein the polycondensation is carried out in the presence of small amounts of an acid-acting catalyst selected from the group consisting of boric acid, phosphoric acid and p-toluenesulfonic acid.

5. A process as claimed in claim 1, wherein the polycondensation is carried out at subatmospheric pressure.

6. A process as claimed in claim 1, wherein the polycondensation is carried out at temperatures of from 150° C. to 380° C.

References Cited

UNITED STATES PATENTS

| | | | |
|---|---|---|---|
| 3,652,498 | 3/1972 | Morello et al. | 260—47 CP |
| 3,661,832 | 5/1972 | Stephens | 260—33.4 P |
| 3,260,691 | 7/1966 | Lavin et al. | 260—30.2 |

LESTER L. LEE, Primary Examiner

U.S. Cl. X.R.

260—47 CZ, CP, 63 R

UNITED STATES PATENT AND TRADEMARK OFFICE
CERTIFICATE OF CORRECTION

PATENT NO. : 3,817,942
DATED : June 18, 1974
INVENTOR(S) : Jenoe Kovacs and Ernst Schefczik It is certified that error appears in the above-identified patent and that said Letters Patent are hereby corrected as shown below:

In Column 1, in the heading, insert --Claims Priority, Application German, January 18, 1972, P 22 02 145.0--;

Column 3, line 59, delete "N-(acetylaminoethyl)" and substitute --N-(2-acetylaminoethyl)--;

Column 2, line 59, delete "boling" and substitute --boiling--.

Signed and Sealed this second Day of December 1975

[SEAL]

Attest:

RUTH C. MASON
Attesting Officer

C. MARSHALL DANN
Commissioner of Patents and Trademarks